UNITED STATES PATENT OFFICE.

ANTONIO MEUCCI, OF CLIFTON, ASSIGNOR TO ALEXANDER McANDREW, OF TODE HILL, NEW YORK.

IMPROVEMENT IN THE MANUFACTURE OF EFFERVESCENT DRINKS FROM FRUITS.

Specification forming part of Letters Patent No. 122,478, dated January 2, 1872.

Specification describing an Improvement in the manufacture of Effervescent Drinks, invented by ANTONIO MEUCCI, of Clifton, Staten Island, in the county of Richmond, State of New York.

I take dry fruit (any kind that can be preserved by drying will serve to give its peculiar flavor to the drink) and grind it fine at one or more operations, with sugar or molasses, or a strong malt solution and a little Cooper or other refined gelatine, adding any desired quantity of fresh water, according to the required strength of the drink. The mass must be moderately stirred at short intervals, and kept at a temperature of about 90° Fahrenheit for a number of hours—say six hours—in which time the finely-divided particles of fruit will have given their properties to the water. It should now be covered and allowed to rest one or two hours, in which time such of the solid particles as do not seek the top will have settled in a tolerably-close layer on the bottom. I now draw out, by means of a cock inserted at a proper distance above the bottom, and charge it with carbonic-acid gas, and bottle in the manner long practiced with bottled soda.

In order to manufacture the drink from fruits in a fresh condition, the same course is pursued with the exception of the grinding. The fruits are mashed and disintegrated by any suitable means, and the mass is treated with sugar, molasses, or malt solution, watered with a thin gelatine solution, and agitated for a considerable period, as before described. But with fresh fruit it is important that the temperature be lower. What is ordinarily termed cold water—say a temperature of 60 or 65° Fahrenheit is proper for fresh fruit.

I can, by properly operating, induce a considerable effervescence of fruit solution by fermentation. Taking fresh or dry fruit, I boil it with hops and evaporate the solution to concentrate it, and then filter it and allow it to cool. Now, having thoroughly incorporated a proper quantity of brewers' yeast, I allow it to stand in a suitable tub or vat until it is fermented. The proper point at which to arrest the fermentation must be learned by experience; but it sometimes takes five or six days. Now, drawing off the liquid, by means of a cock properly elevated above the bottom, I add a small quantity of gelatine and allow it to rest for a few hours. It may then be bottled, either directly or with the addition of a small quantity of carbonic-acid gas, by means of the soda-water apparatus.

Before the fermentation or charging with carbonic-acid the solution must be strained through flannel or other cloth; and in order to complete the precipitation and purification of the solid and gummy matter I prefer to filter it through a thick layer of gravel which has been boiled, and which receives a deposit of the solid matter in passing. The liquid must, in order to thoroughly clarify it, be drawn out from the bottom and poured in at the top many times.

The fermenting alone may be relied on to induce a sufficient effervescent condition, or the carbonic-acid gas may be relied on alone; but where the best result is desired I prefer to employ both.

The gelatine aids materially in clarifying and refining the liquid, and should be used in about three ounces of dry gelatine to a hundred gallons of the product.

I claim as my invention—

The method or process of manufacturing effervescent drinks from fruits, herein set forth.

In testimony whereof I have hereunto set my name in the presence of two subscribing witnesses.

ANTONIO MEUCCI.

Witnesses:
SHIRLEY McANDREW,
N. H. TYRRELL.